United States Patent
Hansen et al.

(10) Patent No.: US 8,700,279 B2
(45) Date of Patent: Apr. 15, 2014

(54) USE OF A CLUTCH PROPORTIONAL-INTEGRAL CONTROLLER TO ASSIST A STATE OBSERVER DURING A VEHICLE SHIFT EVENT

(75) Inventors: R. Anthony Hansen, Redford, MI (US); Robert L. Morris, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 343 days.

(21) Appl. No.: 13/039,348

(22) Filed: Mar. 3, 2011

(65) Prior Publication Data

US 2012/0065856 A1 Mar. 15, 2012

Related U.S. Application Data

(60) Provisional application No. 61/382,516, filed on Sep. 14, 2010.

(51) Int. Cl.
| | | |
|---|---|---|
| G05B 7/00 | (2006.01) | |
| G05B 7/02 | (2006.01) | |
| G05B 1/03 | (2006.01) | |
| G05B 6/02 | (2006.01) | |
| G05B 1/00 | (2006.01) | |
| G05B 6/00 | (2006.01) | |
| F16D 1/00 | (2006.01) | |
| F16D 25/00 | (2006.01) | |
| G06F 17/00 | (2006.01) | |
| G06F 17/17 | (2006.01) | |

(52) U.S. Cl.
CPC .. *G05B 7/00* (2013.01); *G05B 7/02* (2013.01); *G05B 1/00* (2013.01); *G05B 1/03* (2013.01); *G05B 6/00* (2013.01); *G05B 6/02* (2013.01); *F16D 1/00* (2013.01); *F16D 25/00* (2013.01); *G06F 17/00* (2013.01); *G06F 17/17* (2013.01)
USPC ............... 701/67; 701/51; 701/68; 477/34; 477/70; 477/166; 477/174; 477/176

(58) Field of Classification Search
USPC ........................................... 477/176
See application file for complete search history.

(56) References Cited

U.S. PATENT DOCUMENTS

| | | | | |
|---|---|---|---|---|
| 5,070,747 | A  * | 12/1991 | Lentz et al. .................... | 477/149 |
| 6,364,811 | B1 * | 4/2002 | Hubbard et al. ............... | 477/143 |
| 7,356,398 | B2 * | 4/2008 | Steinmetz et al. .............. | 701/55 |
| 8,255,130 | B2 * | 8/2012 | Fujii et al. ........................ | 701/55 |
| 8,560,154 | B2 * | 10/2013 | Hansen et al. .................. | 701/22 |
| 2009/0209383 | A1 * | 8/2009 | Olson et al. ..................... | 475/120 |
| 2012/0065821 | A1 * | 3/2012 | Hessell et al. .................. | 701/22 |
| 2012/0203395 | A1 * | 8/2012 | Hessell et al. .................... | 701/1 |

* cited by examiner

*Primary Examiner* — John Q Nguyen
*Assistant Examiner* — Edward Torchinsky
(74) *Attorney, Agent, or Firm* — Quinn Law Group, PLLC

(57) ABSTRACT

A method for optimizing a shift event in a vehicle includes designating a clutch to be used as an oncoming clutch or an offgoing clutch in the shift event before executing the shift event, and processing a plurality of input values through a state observer to thereby determine, as an output value of the state observer, an estimated slip speed of the designated clutch. The method includes using a proportional-integral control module for the designated clutch (a clutch PI) to close the control loop on the estimated slip speed from the state observer, thereby smoothing a switching between state space equations in the state observer, and executing the shift event. A vehicle includes a transmission, an engine, at least one traction motor, and a control system configured for executing the above method.

12 Claims, 2 Drawing Sheets

USE OF A CLUTCH PROPORTIONAL-INTEGRAL CONTROLLER TO ASSIST A STATE OBSERVER DURING A VEHICLE SHIFT EVENT

CROSS-REFERENCE TO RELATED APPLICATIONS

This application claims the benefit of U.S. Provisional Patent Application No. 61/382,516, filed Sep. 14, 2010, which is hereby incorporated by reference in its entirety.

TECHNICAL FIELD

The present disclosure relates to a method and system for reducing discontinuities during a vehicle shift event by using a proportional-integral controller for a designated clutch to assist a state observer in transitioning between state equations.

BACKGROUND

Certain vehicles are powered in an electric vehicle (EV) mode using one or more traction motors. Each motor is energized by a high-voltage energy storage system (ESS), which may be recharged during vehicle operation or by using an offboard power supply. Hybrid electric vehicles (HEV) in particular can selectively use an internal combustion engine as a power source either alone or in conjunction with the traction motors. Typically, an HEV can operate in an EV mode up to a threshold speed before transitioning to at least partial use of engine power.

A transmission is used to transfer engine and motor torque to a transmission output member via one or more clutches. The output member ultimately powers drive wheels to propel the vehicle. A state observer may be used aboard the vehicle to provide state estimations of various required control parameters. A proportional-integral (PI) control module can provide feedback control over an oncoming or offgoing clutch, or any other rotating member of the powertrain.

SUMMARY

Accordingly, a method is disclosed for optimizing a shift event in a vehicle when switching between linear state space equations in a state observer. A proportional-integral (PI) control module, hereinafter referred to as a clutch PI, may be used to control a designated clutch in the shift event. As set forth herein, the clutch PI is used to calculate and feed an input value to the state observer, and to close the control loop on the state observer.

In particular, a method for optimizing a shift event in a vehicle includes designating a clutch to be used as an oncoming clutch or offgoing clutch in the shift event before executing the shift event, and processing input values through a state observer to determine an estimated slip speed of the designated clutch. The method includes using a clutch PI to close the control loop on the estimated slip speed from the state observer, and thereafter executing the shift event.

A vehicle is also disclosed which includes a transmission, an engine, at least one traction motor, and a control system. The control system includes a state observer and a clutch PI. The control system is configured for determining an estimated clutch slip value of the designated clutch using the state observer, determining a torque value using the clutch PI as a function of the estimated clutch slip value and a reference slip value, and transmitting the torque value from the clutch PI to the state observer. The shift event is then executed. In this manner, a discontinuity is reduced in the estimated clutch slip value from the state observer during any switching occurring between state equations.

The above features and advantages and other features and advantages of the present invention are readily apparent from the following detailed description of the best modes for carrying out the invention when taken in connection with the accompanying drawings.

DETAILED DESCRIPTION

Figure 1:
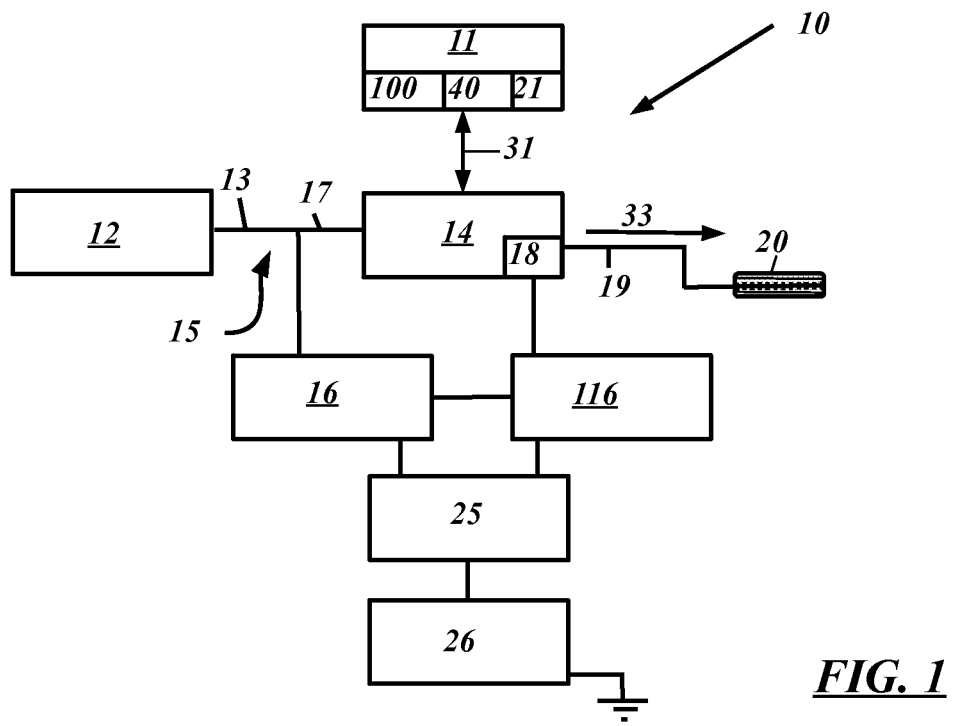
FIG. 1 is a schematic illustration of a vehicle having a control system which uses a clutch PI in conjunction with a state observer to help reduce discontinuities or disturbances when switching between state equations in the state observer.

Referring to the drawings, a vehicle 10 is shown schematically in FIG. 1 having a control system 11. The control system 11 is in communication with the various components of the vehicle 10 via a set of control and feedback signals (arrow 31). The control system 11 includes a state observer 21, which is configured to model a real system, such as a clutch 18 of a transmission 14, in order to provide an estimate of its internal states using input and output measurements provided as part of the control and feedback signals (arrow 31). The control system 11 also includes a proportional-integral (PI) control module providing PI control functionality for the designated clutch 18, hereinafter referred to as a clutch PI 40.

A method 100 (see FIG. 3) may be embodied as a set of computer-executable instructions, which may be recorded on tangible/non-transitory memory and executed by associated hardware components of the control system 11 to reduce discontinuities in a shift event. Such discontinuities may occur when switching between different linear state space equations in the state observer 21, as will be described in more detail below with reference to FIGS. 2 and 3. Execution of the method 100 helps smooth any transition or switching between state equations by closely maintaining a slip estimate of a designated clutch 18 or other member to a calibrated reference value.

When the designated clutch 18 is actively engaging, the actual slip measured across the clutch 18 will approach zero. Within the state observer 21, the estimated slip value will likewise approach zero. However, the estimated slip value may at times pass through zero and beyond. When this occurs, a disturbance or discontinuity may be seen at the moment of switching between different state equations in the state observer 21.

The occurrence of such discontinuities is largely due to estimated speeds jumping from one value in a range where the designated clutch 18 is unlocked to another value in a range where the clutch 18 is locked. In many cases, the speed differences can be rather large, and may cause a disturbance due to timing, i.e., as to when the state observer 21 is directed to switch between different state equations versus the time at which an engaging clutch 18 actually locks. The control system 11 can be used in one embodiment as part of a hybrid electric vehicle (HEV) of the type shown in FIG. 1, or alternatively as an extended range electric vehicle (EREV).

Depending on the embodiment, the vehicle 10 of FIG. 1 may include an internal combustion engine 12, which may be selectively connectable to the transmission 14 via an input clutch 15. The input clutch 15 may include a spring a damper assembly (not shown) for damping the connection between a crankshaft 13 of the engine 12 and an input shaft 17 of the transmission 14. Electrical traction motors 16, 116 may be used to deliver motor torque to the transmission 14, and to thereby power the vehicle 10 in an EV propulsion mode. This may occur up to a threshold vehicle speed. Above the threshold speed, the engine 12 can be started and used to deliver engine torque to the input shaft 17 as needed.

The transmission 14 may include an output shaft 19 connected to a set of drive wheels 20. The transmission 14 may be configured as an electrically-variable transmission (EVT) or any other suitable transmission capable of transmitting torque to the drive wheels 20 via the output shaft 19. The output shaft 19 delivers the actual output torque (arrow 33) in response to a speed request from a driver of the vehicle 10.

Still referring to FIG. 1, the traction motors 16, 116 may be configured as a multi-phase electric machine of approximately 60VAC to approximately 300VAC or more depending on the required design. Each traction motor 16, 116 is electrically connected to an energy storage system (ESS) 26 via a high-voltage DC bus, a power inverter module 25, and a high-voltage AC bus. A DC-DC converter (not shown) may be used to regulate the voltage to a 12V auxiliary power system aboard the vehicle.

The control system 11 may include a single control device or a distributed networked control device providing PI functionality over the required portions of transmission 14. The various hardware elements of the control system 11 are electrically connected to or otherwise placed in electrical communication with the engine 12, the traction motors 16 and 116, the drive wheels 20, and the transmission 14 via suitable control channels. Such control channels may include any required transfer conductors providing a hard-wired or wireless control link suitable for transmitting and receiving the necessary electrical control signals for proper power flow control and coordination aboard the vehicle 10. The control system 11 may also include such additional control modules and capabilities as might be necessary to execute the required power flow control functionality aboard vehicle 10 in the desired manner.

The control system 11 may include a microprocessor or central processing unit, read only memory (ROM), random access memory (RAM), electrically-erasable programmable read only memory (EEPROM), a high-speed clock, analog-to-digital (A/D) and digital-to-analog (D/A) converter circuitry, and input/output circuitry and devices (I/O), as well as appropriate signal conditioning and buffer circuitry. Any media used as tangible/non-transitory memory for recording the method 100 may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer.

Figure 2:
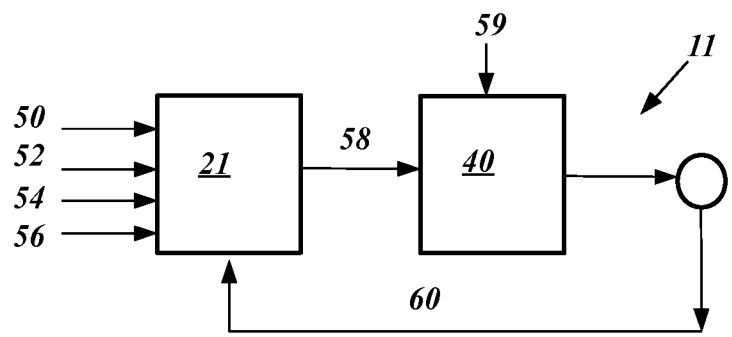
FIG. 2 is a schematic illustration of a control system usable with the vehicle shown in FIG. 1.

Referring to FIG. 2, the present control system 11 provides PI functionality via the clutch PI 40, and also provides linear space state observation capabilities via the state observer 21. Both terms are well understood in the art. The state observing qualities of the control system 11 include the capability of modeling a physical system, e.g., an oncoming clutch or other element of the transmission 14 shown in FIG. 1, to provide an estimate of the internal state of the system using various input and output measurements, as well as state variables which are related by first order differential equations.

The state observer 21 inputs may include a measured engine speed (arrow 50), speeds of the respective traction motors 16, 116 (arrows 52 and 54), and an actual or estimated output speed of the transmission 14 (arrow 56). The state observer 21 estimates various output values, e.g., engine speed, speed of motor(s) 16 and/or 116, transmission output speed, wheel speed, vehicle speed, axle torque, and damper torque, and calculates an estimated clutch slip (arrow 58) in a manner dependent on the transmission range. The clutch PI 40 receives the estimated clutch slip (arrow 58) from the state observer 21 and closes the control loop on this particular value using a calibrated reference clutch slip (arrow 59), which may be stored in memory and retrieved as needed. Thus, the control target for the clutch PI 40 follows the calibrated reference clutch slip (arrow 59) rather than being automatically set to a zero value.

The reference clutch slip (arrow 59) can be calculated as a function of values describing speeds of the clutch 18 of FIG. 1. For instance, the reference clutch slip (arrow 59) may be calculated using a combination of engine speed ($N_E$), motor speeds ($N_A$, $N_B$), and transmission output speed ($N_O$) depending on the location of the designated clutch. This goes for both a derived speed measurement, i.e., a calculated value from other measurements, as well as for any clutch estimates and reference values.

With speed control, up to two speeds can be controlled at a given time, e.g., clutch input speed and clutch slip, two clutch slip speeds when the vehicle 10 is operating in a Neutral state (two speed degrees of freedom), input speed only when the vehicle 10 is operating in a Mode case (one speed degree of freedom), or no controlled speeds when the vehicle 10 is operating in a Gear case (no speed degrees of freedom because the speeds are dictated by the vehicle). A speed target is received for each of the controlled speeds. For damping and speed control, these speed targets are translated into calibrated reference values for the variables $N_E$, $N_A$, $N_B$, and $N_O$ noted above in order to generate the proportional torque or P terms, in addition to using the damper torque ($T_{DMPR}$) and axle torque ($T_{AXLE}$).

These references are in direct correlation to the speed targets. The proportional torque calculations may be as follows:

$$P_A = (K_1 \cdot N_{E*}) + (K_2 \cdot N_{A*}) + (K_3 \cdot N_{B*}) + (K_4 \cdot N_{O*}) + (K_5 \cdot T_{DMPR*}) + (K_6 \cdot T_{AXLE*})$$

$$P_B = (K_7 \cdot N_{E*}) + (K_8 \cdot N_{A*}) + (K_9 \cdot N_{B*}) + (K_{10} \cdot N_{O*}) + (K_{11} \cdot T_{DMPR*}) + (K_{12} \cdot T_{AXLE}^*)$$

where $P_A$ and $P_B$ are the proportional or P control terms, i.e., the damping torque commands for the respective A and B traction motors, which are the traction motors 16 and 116, respectively, and with $K_1$-$K_{12}$ representing the proportional gains. The proportional gains can be calculated as a function of controlled engine speed ($N_E$), motor speeds ($N_A$, $N_B$) for the respective traction motors 12 and 14, damper torque ($T_{DMPR}$) for damping the engine-transmission connection, and axle torque ($T_{AXLE}$). The values denoted by an asterix (*) are speed or torque error values, e.g., $N_{A*}$ is a speed error of motor A/traction motor 12, and $T_{AXLE*}$ is a torque error for the axle torque.

Clutch slip references used with the clutch PI 40 of FIGS. 1 and 2 can be calculated from the values of $N_E$, $N_A$, $N_B$, and $N_O$ that were used for generating the errors for control noted above. A general equation for calculating the clutch slip for a reference clutch (CX) is as follows:

$$N_{CX\_REF} = (K_{E\_CX} \cdot N_{E\_REF}) + (K_{A\_CX} \cdot N_{A\_REF}) + (K_{B\_CX} \cdot N_{B\_REF}) + (K_{O\_CX} \cdot N_{O\_REF})$$

Depending on the clutch slip reference that is being calculated, some terms will drop out because the gain for that particular term is zero, i.e., there is no relationship between the two speeds used in the equation.

Among the outputs from the clutch PI 40 is a clutch torque value (arrow 60), i.e., a clutch torque required to maintain a slip estimate of a given clutch at its reference value, which would normally be zero or approaching zero during a shift event. The clutch torque value (arrow 60) is fed into the state observer 21 in a closed loop as shown. The approach in FIG. 2 allows a smooth transition for equation changes in the state observer 21 when the two sides of a given clutch are synchronized before locking the clutch and changing state equations.

Figure 3:
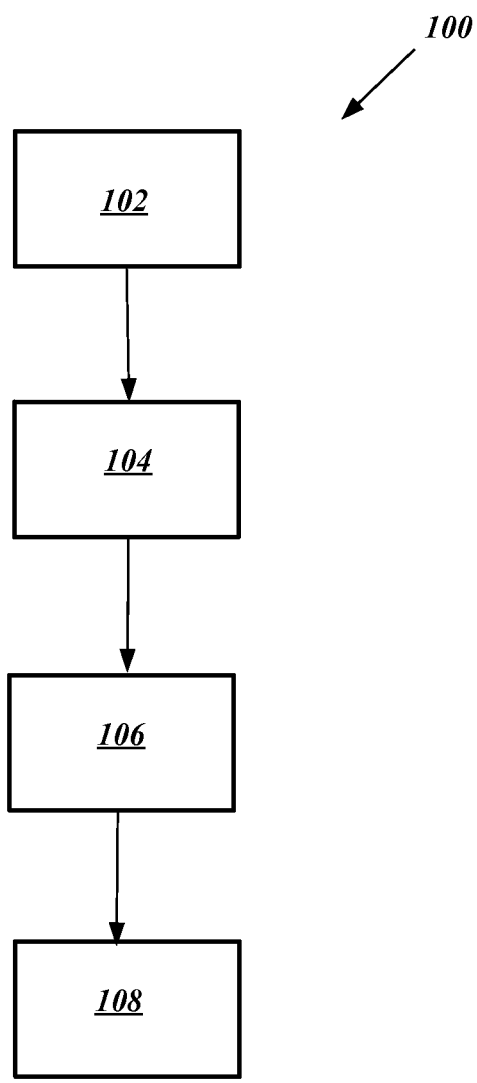
FIG. 3 is a flow chart describing a method for reducing the discontinuities or disturbances noted above.

Referring to FIG. 3, the present method 100 is described with respect to operation of a designated clutch of the transmission 14 shown in FIG. 1, e.g., the clutch 18. The clutch 18 may be a clutch identified as an oncoming clutch for an upcoming shift event. In the following steps, integrator software of the clutch PI 40 should be reset or initialized depending on whether the designated clutch described above is going to be an on-coming or off-going clutch for the upcoming shift event. If the designated clutch 18 is an on-coming clutch, then the received torque estimate is passed through until the clutch PI 40 is triggered. At that point, the clutch PI 40 picks up at the value that was left off for the torque. For example, if the torque estimate reaches 20 Nm before the clutch PI 40 is triggered, then the integrator portion of the clutch PI 40 starts at 20 Nm for its first calculation.

If the designated clutch 18 is an off-going clutch, then all of the torque attributed to the torque estimate received by a driveline dynamic response component is clutch reactive torque. This is not considered to be actual torque acting on the designated clutch 18. Therefore, the integrator portion of the clutch PI 40 initiates to a zero value. When the switch between state equations within the state observer 21 initiates from a state in which the designated clutch 18 is locked to a state where the clutch 18 is not locked, extra torque is not fed into the estimator while the clutch 18 is still bleeding off pressure. This zero initialization may be held for a calibrated time to cover the pressure bleed off. If the clutch PI 40 is somehow re-triggered to bring the designated clutch 18 back on while the designated clutch 18 was still in the process of bleeding off pressure, then the clutch PI 40 starts at zero. If a timer had expired for the bleed off period, the method 100 would resume passing through the clutch torque estimate steps, which normally would be zero or some small value.

In one embodiment, the method 100 begins with step 102 wherein various vehicle operating values are determined, e.g., the engine speed (arrow 50), motor speeds (arrows 52 and 54), axle torque, output speed (arrow 56), wheel speed, engine speed, etc. as shown in FIG. 2 and described above. These values are fed into the state observer 21, and the method 100 proceeds to step 104.

At step 104, the state observer 21 determines an estimated clutch slip (arrow 58 of FIG. 2), e.g., using the values from step 102, as a dependent variable of any estimated states within the state observer 21. The estimated clutch slip (arrow 58) can be modified as needed by a designated PI module for the clutch 18, i.e., the clutch PI 40, in a closed loop using the calibrated reference slip value (arrow 59) shown in FIG. 2.

At step 106, the clutch PI 40 for the designated clutch 18 may use the value from step 104 to calculate the torque value (arrow 60) of FIG. 2. This value is necessary for maintaining the designated clutch's slip estimate, i.e., arrow 58, at its reference value, i.e., arrow 59, or within a maximum permissible range thereof.

At step 108, the torque value (arrow 60), as shown in FIG. 2, is fed back into the state observer 21 and used as an input to the state observer 21. In this manner, the clutch PI 40 for the designated clutch is used as an input to the state observer 21 in order to maintain any error between the reference clutch slip value (arrow 59) and the estimated clutch slip (arrow 58) at or near zero. This level of error is maintained until the state observer 21 is told to switch between state equations. In turn, a smoother transition results whenever the state observer 21 does eventually switch between state equations.

While the best modes for carrying out the invention have been described in detail, those familiar with the art to which this invention relates will recognize various alternative designs and embodiments for practicing the invention within the scope of the appended claims.

The invention claimed is:

1. A method for optimizing a shift event in a vehicle, the method comprising:
   designating a clutch to be used as an oncoming clutch or an offgoing clutch in the shift event before executing the shift event;
   processing a plurality of input values through a state observer to thereby determine, as an output value of the state observer, an estimated clutch slip speed of the designated clutch;
   using a proportional-integral (PI) control module for the designated clutch to receive the estimated clutch slip speed from the state observer and a calibrated reference clutch slip speed, and to derive a clutch torque value needed to maintain the estimated clutch slip speed at the calibrated reference clutch slip speed;
   feeding the clutch torque value into the state observer to close the control loop on the estimated clutch slip speed from the state observer, thereby smoothing a switching between state space equations in the state observer by maintaining the estimated clutch slip speed at the calibrated reference clutch slip speed; and
   executing the shift event.

2. The method of claim 1, wherein executing the shift event includes synchronizing an input and output side of the designed clutch before locking the designated clutch, and before switching between the different state space equations.

3. The method of claim 1, wherein the vehicle includes an engine, a traction motor, and a transmission, and wherein processing a plurality of input values through a state observer includes calculating the estimated clutch slip speed as a function of engine speed, motor speeds, and transmission output speed.

4. The method of claim 1, further comprising:
   calculating the reference clutch slip speed using at least one of engine speed, motor speeds, and transmission output speed as the plurality of input values.

5. A vehicle comprising:
   a transmission;
   an engine;
   a traction motor; and
   a control system including a state observer and a proportional-integral (PI) clutch control module for a designated clutch in the transmission, wherein the control system is configured for:
      determining an estimated clutch slip speed of the designated clutch from a plurality of input values using the state observer;

receiving, via the PI clutch control module, the estimated clutch slip speed and a calibrated reference clutch slip speed;

determining a clutch torque value using the PI clutch control module as a function of the estimated clutch slip speed and the calibrated reference clutch slip speed, wherein the clutch torque value is an amount of clutch torque necessary for maintaining the estimated clutch slip speed within a calibrated range of the calibrated reference clutch slip speed;

transmitting the clutch torque value from the clutch PI to the state observer to thereby maintain the estimated clutch slip speed within the calibrated range of the calibrated reference clutch slip speed; and executing the shift event, including using the clutch torque value to reduce a discontinuity in the estimated clutch slip speed from the state observer during a change in state equations in which switching occurs between different state space equations in the state observer.

6. The vehicle of claim 5, wherein the control system is configured for initializing the PI clutch control module in one manner when the designated clutch is an oncoming clutch and in another manner when the designated clutch is an off-going clutch.

7. The vehicle of claim 5, wherein the controller is configured to calculate the calibrated reference clutch slip speed at least one of: engine speed, motor speed for each of the traction motors, and transmission output speed.

8. The vehicle of claim 5, wherein the control system is configured for executing the shift event in part by synchronizing an input and output side of the designed clutch before locking the designated clutch and before switching between the different state space equations.

9. A method for optimizing a shift event in a vehicle having an engine, a traction motor, and a transmission, the method comprising:

designating a clutch to be used as an oncoming clutch or an offgoing clutch in the shift event before executing the shift event;

processing a plurality of input values through a state observer to determine, as an output value of the state observer, an estimated clutch slip speed of the designated clutch, including calculating the estimated clutch slip speed as a function of engine speed, motor speeds, and transmission output speed;

using a proportional-integral (PI) control module for the designated clutch to close the loop on the estimated clutch slip speed from the state observer, including:

processing the estimated clutch slip speed and a calibrated reference clutch slip speed using the PI control module;

generating a torque value of the designated clutch, wherein the torque value is an amount of torque required for maintaining the estimated clutch slip speed during the shift event within a calibrated range of the calibrated reference clutch slip speed; and feeding the clutch torque value back into the state observer from the PI control module as one of the plurality of input values to the state observer to thereby maintain the estimated clutch slip speed during the shift event within a calibrated range of the calibrated reference clutch slip speed; and executing the shift event, including synchronizing an input and output side of the clutch before switching between the different state space equations.

10. The method of claim 9, further comprising: calculating the reference clutch slip speed using at least one of engine speed, motor speed, and transmission output speed.

11. The method of claim 9, further comprising:

determining whether the designated clutch is an oncoming clutch or an offgoing clutch; and initializing the PI control module in a different manner depending on whether the designated clutch is the oncoming clutch or the offgoing clutch.

12. The method of claim 11, further comprising: initiating the PI control module to a zero value only when the designated clutch is the offgoing clutch.

* * * * *